Aug. 24, 1954  L. LEE II  2,687,009
CONTROL APPARATUS FOR RESONANT TYPE JET ENGINES
Filed Sept. 20, 1947
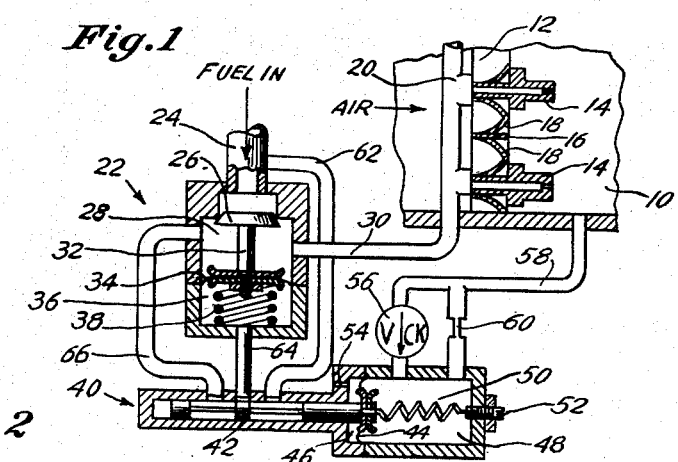
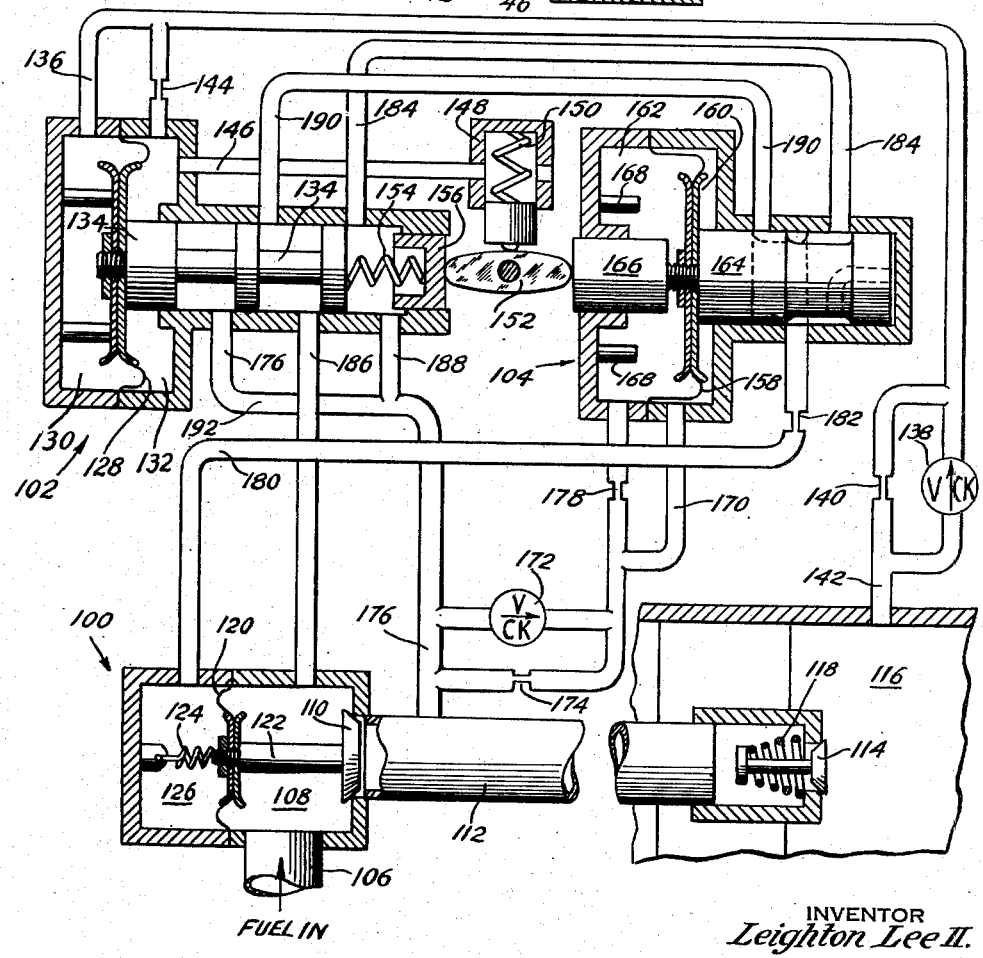
INVENTOR
Leighton Lee II.
BY Lester W Clark
ATTORNEY Patented Aug. 24, 1954

2,687,009

UNITED STATES PATENT OFFICE 2,687,009

CONTROL APPARATUS FOR RESONANT TYPE JET ENGINES

Leighton Lee II, Rocky Hill, Conn., assignor to Niles-Bement-Pond Company, West Hartford, Conn., a corporation of New Jersey Application September 20, 1947, Serial No. 775,322

9 Claims. (Cl. 60—39.28)

The present invention relates to control apparatus for internal combustion engines, and especially to engines of the type in which the combustion chamber pressure varies cyclically. It is of especial utility in connection with engines of the resonant jet type, and is shown in connection with such an engine, although it may be used with other types of combustion engines.

In the resonant jet type of engine, fuel and air are supplied to the combustion chamber at predetermined rates. Combustion is initiated either by a continuously supplied spark or upon contact of a combustible mixture with the hot walls of the combustion chamber. When combustion occurs, the resulting high pressure in the combustion chamber operates suitable valve mechanism provided for the purpose of cutting off the air supply. The combustion chamber pressure is then momentarily greater than the fuel supply pressure, so that the fuel supply is effectively cut off, also. The products of combustion expand out through the exhaust passage, producing the jet which propels the engine. As soon as the combustion chamber pressure falls off sufficiently, the air valves open, the fuel supply resumes, and the cycle is repeated.

In such engines, the greatest thrust is obtained when the highest pressure is produced in the combustion chamber. For maximum thrust, it is therefore desirable to control the fuel supply so as to maintain the peak combustion chamber pressure at a maximum value.

This maximum peak combustion chamber pressure does not, however, represent the most efficient engine operating condition. The maximum efficiency occurs when the peak combustion chamber pressure is at some lower value which depends upon a number of other factors, such as engine design, atmospheric pressure, etc.

It is desirable to operate an engine of this type either at its maximum thrust or at its maximum efficiency. For example, if used in a flying bomb, it is desirable to use maximum thrust at take-off and when nearing the destination. At other times, it is desirable to use the most efficient power in order to obtain the maximum range with a given fuel supply.

It is therefore an object of the present invention to provide an improved fuel supply system for a resonant jet type internal combustion engine.

A further object is to provide a fuel supply system which may be operated to maintain a selected combustion chamber pressure.

A further object is to provide a system which will maintain the maximum combustion chamber pressure.

A further object is to provide a system which will selectively maintain either a predetermined combustion chamber pressure or maximum combustion chamber pressure.

Other objects and advantages of my invention will become apparent from a consideration of the appended specification, claims and drawing, in which Figure 1 illustrates, somewhat diagrammatically, a fuel supply control system for a resonant jet engine, embodying some of the principles of my invention, and adapted to maintain a selected peak pressure in the combustion chamber, and Fig. 2 illustrates, somewhat diagrammatically, a more elaborate fuel supply control system which selectively maintains either a predetermined peak combustion chamber pressure or maximum peak combustion chamber pressure.

Figure 1

There is shown in Fig. 1 a portion of a combustion chamber 10 of a resonant or intermittent type jet engine. Extending across the inlet side of the chamber 10 is a grille 12 through which projects a series of nozzles 14. Between the nozzles are located horizontal louvers 16. Attached to each of the louvers 16, and to each of the nozzles 14, are a series of flexible vanes 18. These vanes are designed to open when the air pressure on the entrance side of the grille 12 is greater than the pressure in the combustion chamber, and to close when the combustion chamber pressure is greater. They are shown in their closed position.

Fuel is supplied to the nozzles 14 through a manifold 20, which receives fuel from a regulating valve unit generally indicated at 22.

Fuel for the engine comes from a tank (not shown) and flows through a conduit 24, past a valve 26, a chamber 28 in the valve unit 22 and thence through a conduit 30 to manifold 20 and nozzles 14. The valve 26 is attached by a stem 32 to a flexible diaphragm 34 which separates chamber 28 from a chamber 36. A spring 38 within the chamber 36 biases the valve 26 toward closed position.

The position of the regulating valve 26 is determined by a control or pilot valve unit generally indicated at 40. The control valve unit 40 includes a piston valve 42 positioned by a diaphragm 44 which separates a pair of expansible chambers 46 and 48. The diaphragm 44 and valve 42 are biased to the right by means of a tension spring 50, which is adjustable by means of a screw 52.

The chamber 46 is vented to atmosphere as indicated at 54. The chamber 48 is connected through a check valve 56 and a conduit 58 to the combustion chamber 10. A fixed restriction 60 is connected in parallel with the check valve 56. Although the restriction 60 and valve 56 are shown as separate structures for the purpose of this diagrammatic drawing, it may be preferable to use a simple check valve with a notch in its seat to provide a slight leak through it at all times.

*Operation of Figure 1*

The particular peak combustion chamber pressure which the system is to maintain may be selected by manipulation of the adjusting screw 52. The check valve 56 is designed as to size and spring loading so that it opens only when the combustion chamber pressure approaches its peak value. The restriction 60 is much smaller than the opening in the check valve 56, so that each explosion in the combustion chamber causes valve 56 to open momentarily, thereby discharging fluid at the combustion chamber pressure into chamber 48. As the pressure in the combustion chamber drops off, the fluid in chamber 48 leaks out through restriction 60. The rate of leakage is so designed with respect to the frequency of explosions in the engine that the next explosion builds up the pressure in chamber 48 again before it has decreased materially from the pressure existing during the explosion.

The rate at which the explosions follow each other in the combustion chamber is relatively high compared to the mass of diaphragm 44 and valve 42, so that the cyclical variations in pressure in chamber 48 due to the explosions do not cause substantial variations in the position of valve 42. The pressure in chamber 48 is therefore a measure of the average peak combustion chamber pressure.

The effective area of diaphragm 34 is made substantially equal to that of valve 26. Hence the pressure in chamber 28 acts in opposite directions against equal areas so that valve 26 is balanced against the pressure in chamber 28. The inlet pressure above valeve 26 acts in an opening direction on it, and the pressure in chamber 36 acts on diaphragm 34 in a valve-closing direction. The latter pressure is supplemented by the force of spring 38.

When the average peak combustion chamber pressure falls below the value determined by the setting of spring 50, that spring moves valve 42 to the right, thereby admitting fuel at the pressure in chamber 28 through conduit 66, past valve 42 and through conduit 64 to chamber 36. The pressure in chamber 36 is thereby made substantially lower than the inlet pressure acting downward on valve 26, so that the valve is moved in an opening direction. This movement continues until the increased fuel supply is sufficient to restore the combustion chamber pressure to its previously selected value.

If the average peak combustion chamber pressure increases above the desired value, the diaphragm 44 and valve 42 are moved to the left, thereby admitting fuel at inlet pressure through conduit 62 past valve 42 into conduit 64 and chamber 36. The pressure in chamber 36 is thereby made equal to the inlet pressure acting downwardly on valve 26, and the spring 38 moves valve 26 toward closed position to decrease the fuel flow to the engine and restore the combustion chamber pressure to its selected value.

*Figure 2*

There is shown in Fig. 2 a system which may operate either to maintain maximum combustion chamber pressure or to maintain a selected value of combustion chamber pressure.

A fuel regulator generally indicated at 100 is controlled by selector valve units 102 and 104. The selector valve 102 operates in response to the combustion chamber pressure, while selector valve 104 operates in response to the rate of flow of fuel to the engine.

Fuel comes from a tank (not shown) and flows through a conduit 106, a chamber 108 in the fuel regulator 100, past a valve 110, through a conduit 112 and through a spring loaded discharge valve 114 into the combustion chamber 116. The valve 114 is biased closed by means of a spring 118, and opens increasingly as the fuel pressure on its upstream side increases.

The fuel regulator 100 includes a diaphragm 120 connected to valve 110 by a stem 122. A tension spring 124 biases the valve 110 toward open position. The diaphragm 120 separates chamber 108 from a chamber 126.

The fuel regulator 100 includes a diaphragm 120 connected to valve 110 by a stem 122. A tension spring 124 biases the valve 110 toward open position. The diaphragm 120 separates chamber 108 from a chamber 126.

The selector valve unit 102 includes a diaphragm 128 separating a pair of expansible chambers 130 and 132. Attached to the center of diaphragm 128 is a piston valve 134. Chamber 130 is connected through a conduit 136, and a check valve 138 with a parallel restriction 140, and a conduit 142 to the combustion chamber 116. The check valve 138 and restriction 140 correspond to the check valve 56 and restriction 60 of Fig. 1. Chamber 132 is connected through a fixed restriction 144 to the conduit 136. Chamber 132 is also connected through a conduit 146 to a vent valve 148 which is biased to open position by a spring 150, and which may be operated to closed position by a cam 152. A spring 154 is retained between the right end of valve 134 and a retainer 156 which engages cam 152.

The selector valve 104 includes a diaphragm 158 separating a pair of expansible chambers 160 and 162. The diaphragm 158 is attached at its center to a piston valve 164. A spacer block 166 lies between the valve 164 and the cam 152. A series of stops 168 limit the leftward movement of diaphragm 158.

Chamber 160 is connected through a conduit 170, a check valve 172 in parallel with a fixed restriction 174, and a conduit 176 to the fuel conduit 112. Check valve 172 and restriction 174 are similar in structure and function to check valve 60 and restriction 56 of Fig. 1. They are required in this case because of the cyclical variation of fuel pressure due to opening and closing of valve 114. The chamber 162 is connected through a restriction 178 to the conduit 170.

When the cam 152 is in the position shown in the drawing, spacer 166 holds the valve 164 near the right-hand end of its range of movement. The chamber 126 in the fuel regulator 100 is then connected through conduit 180, restriction 182, past valve 164, and through conduit 184 to a port adjacent the valve 134 and thence past valve 134 and through conduits 188 and 176 to the conduit 112.

The effective area of diaphragm 120 is substantially the same as that of valve 110, so that the valve is balanced against the pressure in chamber 108. Since, as above described, chamber 126 is connected through selector valves 104 and 102 to conduit 112, the pressure in that conduit acts on diaphragm 120 in a valve closing direction. It is opposed by the same pressure in conduit 112 acting in an opening direction directly on valve 110 and by the force of tension spring 124. Spring 124 therefore moves the valve in an opening direction, since the pressures acting on the valve are all balanced.

When cam 152 is in the position shown, vent valve 148 is open, so that the pressure in chamber 132 is atmospheric. The pressure in chamber 130 is the combustion chamber pressure, as modified by check valve 138 and restriction 140.

Cam 152 has moved retainer 156 to a position where spring 154 actively biases valve 134 toward the left.

When the combustion chamber pressure has a certain value, determined by the strength of spring 154, the valve 134 is positioned so that it blocks the port leading to conduit 184. The fluid within chamber 126 is then trapped there and the pressure therein remains constant. When the combustion chamber pressure exceeds that predetermined value, valve 134 moves to the right, connecting conduit 184 through conduit 186 with chamber 108. This increases the pressure in chamber 126 to equal that in chamber 108. Valve 110 is then moved toward closed position by the pressure differential acting in opposition to spring 124. This decreases the fuel flow, thereby decreasing the combustion chamber pressure again to its selected value. When the combustion chamber pressure falls below the desired value, valve 134 moves toward the position shown in the drawing, thereby connecting chamber 126 with conduit 112, so that spring 124 moves valve 110 toward open position, thereby increasing the fuel flow so as to restore the combustion chamber pressure to the desired value.

When it is desired to operate the engine at maximum power rather than maximum efficiency, the cam 152 is rotated through 90°. This closes the vent valve 148, and relieves the force of spring 154 previously acting on valve 134. At the same time, the spacer 166, which limited the leftward movement of valve 164 is removed as an effective stop.

Selector valve unit 104 now is operated in accordance with the rate of change of fuel pressure in conduit 112. In other words, if the pressure in conduit 112 is increasing, then the pressure in chamber 160 exceeds that in chamber 162, because of the effect of restriction 178 in delaying the increase of pressure in chamber 162, so that valve 164 is moved to the dotted line position shown in the drawing. However, if the pressure in conduit 112 is decreasing, then the pressure in chamber 162 exceeds that in chamber 160, so that valve 164 is moved to the full line position shown in the drawing wherein conduit 180 is connected to conduit 184.

Because of the closing of vent valve 148, the restriction 144 is now effective to modify the pressure in chamber 132, so that selector valve unit 102 now responds to the rate of change of combustion chamber pressure rather than to the difference between that pressure and atmospheric pressure.

The dimensions and characteristics of spring 154 are such that it is removed completely as an influence on the position of valve 134 when the cam 152 is rotated through 90°.

Under these conditions, the system operates to alternately increase or decrease the fuel flow so as to cause the combustion chamber pressure to hunt about its maximum pressure. There is a certain value of fuel flow which will produce the maximum combustion chamber pressure. Increase of the fuel flow above this value will decrease the combustion chamber pressure because of the enriching of the combustible mixture will produce less complete combustion. Likewise, a decrease in the amount of fuel flow will decrease the combustion chamber pressure.

Consider the cycle of operations which ensues when the cam 152 is rotated for maximum thrust, if the fuel flow and combustion chamber pressure are both increasing at that time. The increase in fuel flow causes the valve 164 to move to the left to the position shown in dotted lines in the drawing, so that conduit 180 is connected to conduit 190. The increase in combustion chamber pressure moves the valve 134 to the right so that conduit 190 is connected to conduit 176 and thence to conduit 112. The pressure in chamber 126 is then the same as in conduit 112 and valve 110 therefore continues to move in a fuel flow increasing direction under the influence of spring 124.

The fuel flow continues to increase until the average peak combustion chamber pressure reaches its maximum and starts to decrease again. When that happens, valve 134 is moved to the left, thereby connecting conduit 190 with conduit 186. This connects chamber 126 to chamber 108, thereby reversing valve 110 and starts the fuel flow decreasing with the result that the combustion chamber pressure again starts to increase. As soon as the fuel flow starts to decrease, valve 164 moves to the right, thereby connecting conduit 180 with conduit 184, and the increasing combustion chamber pressure substantially simultaneously moves valve 134 to the right, connecting conduit 184 with conduit 186, and hence with chamber 108. This connection keeps the fuel flow decreasing until the maximum combustion chamber pressure is again reached. When the combustion chamber pressure starts to decrease from the maximum, valve 134 again reverses itself and moves to the left, thereby connecting conduit 184 with conduit 188 and starting the fuel flow increasing again. When this happens, the valve 164 is again moved to the right, connecting conduits 180 and 184. Substantially simultaneously, the combustion chamber pressure begins to increase because of the increased fuel flow, and valve 134 moves again to the right, connecting conduits 184 and 186, so that the fuel flow continues to increase. The cycle is now complete, and may start over again.

The restriction 182 is provided to slow the motion of the main fuel valve 110 so as to prevent it from responding too quickly at a time when the valves 134 and 164 are moving simultaneously.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Fuel supply control apparatus for an internal combustion engine having incorporated therein a combustion chamber in which the pressure varies cyclically with the operating cycle of said engine, comprising fuel flow controlling valve means, an operator for said valve means, means for generating a fluid pressure indicative of the average maximum pressure in said combustion chamber, pressure sensitive means, responsive only to said fluid pressure, for controlling said operator in accordance with said pressure; said pressure generating means including an expansible chamber adjacent said pressure sensitive means, a conduit connecting said expansible chamber and said combustion chamber, a check valve in said conduit for permitting flow therethrough whenever the pressure in the combustion chamber exceeds the pressure in the expansible chamber by a predetermined amount, and a fixed restriction connected in parallel with said check valve for permitting a retarded flow from the expansible chamber to the combustion chamber whenever the combustion chamber pressure is lower than the expansible chamber pressure, said check valve and restriction cooperating to vary the pressure in said expansible chamber as a function of the maximum value of the cyclically varying pressure in said combustion chamber.

2. Fuel supply control apparatus for an internal combustion engine having incorporated therein a combustion chamber in which the pressure varies cyclically with the operating cycle of said engine, comprising fuel flow controlling valve means, an operator for said valve means, means for generating a fluid pressure indicative of the average maximum pressure in said combustion chamber, pressure sensitive means, responsive only to said fluid pressure, for controlling said operator in accordance with said pressure; said pressure generating means including an expansible chamber adjacent said pressure sensitive means, conduit means connecting said combustion chamber and said expansible chamber, a check valve in said conduit means opening in the direction of flow toward said expansible chamber, and a fixed restriction connected in parallel with said check valve.

3. Fuel supply control apparatus for an internal combustion engine, comprising a fuel flow controlling valve, means biasing said valve in one direction, a fluid motor for operating said valve against said biasing means, a first source of fluid at a pressure high enough to overcome said biasing means when supplied to said fluid motor, a second source of fluid at a substantially lower pressure, a first selector valve, means responsive to the direction of change of the pressure in the combustion chamber of said engine for operating said selector valve to a first position when said pressure is increasing and to a second position when said pressure is decreasing, a second selector valve, means responsive to the direction of change of the rate of fuel flow to said engine for operating said second selector valve to a first position when said fuel flow is increasing and to a second position when said fuel flow is decreasing, and means including both said selector valves for connecting said motor selectively to said sources, said connecting means being effective when both selector valves are in corresponding positions to cause operation of said fuel flow controlling valve in a fuel flow increasing direction and when said selector valves are in opposite positions to cause operation of said fuel flow controlling valve in a fuel flow decreasing direction.

4. Fuel supply control apparatus for an internal combustion engine, comprising fuel flow controlling means, means for operating said fuel flow controlling means, means for controlling said operating means, and means for rendering said last controlling means selectively responsive only to either the pressure in a combustion chamber in said engine or to the direction of change of said pressure, whereby said fuel flow is controlled in accordance with either said pressure, or its direction of change.

5. Fuel supply control apparatus for an internal combustion engine, comprising fuel flow controlling valve means, means for operating said valve means including a pair of expansible chambers separated by a movable wall, means operatively connecting said wall and said valve means, means for supplying to one of said chambers a fluid at a pressure indicative of the pressure in a combustion chamber of said engine, means forming a vent for maintaining the other chamber substantially at atmospheric pressure, a spring acting on said wall in opposition to the pressure in said one chamber, and a restricted passage connecting said chambers.

6. Fuel supply control apparatus as in claim 5, comprising means for closing said vent to make said operating means responsive to the rate of change of pressure in said combustion chamber.

7. Fuel supply control apparatus as in claim 6, comprising means for relieving the force of said spring simultaneously with the closure of said vent so that said wall moves to one end or the other of its range of travel, depending upon the direction of change of said combustion chamber pressure.

8. Fuel supply control apparatus as in claim 7, in which said fuel flow controlling valve means includes a fuel conduit, a valve in said fuel conduit, and hydraulic motor means for positioning said valve, said operating means includes a pilot valve for controlling said motor means, and said connecting means connects said wall and said pilot valve.

9. Fuel supply control apparatus as in claim 8, comprising a second pilot valve cooperating with said first-mentioned pilot valve to control said hydraulic motor means, means responsive to the rate of flow of fuel to said engine for operating said second pilot valve to one end or the other of its range of travel depending upon the direction of change of said rate of fuel flow, and means movable concurrently with said vent closing means and effective when said vent is open to move said second pilot valve to one end of its range of travel and hold it there, so that said hydraulic motor means is then controlled by said first-mentioned pilot valve acting alone.

References Cited in the file of this patent

UNITED STATES PATENTS

| Number | Name | Date |
| --- | --- | --- |
| 1,052,588 | Janicki | Feb. 11, 1913 |
| 1,114,877 | Goreau | Oct. 27, 1914 |
| 1,190,799 | René | July 11, 1916 |
| 1,236,793 | Warman | Aug. 14, 1917 |
| 2,095,991 | Lysholm | Oct. 19, 1937 |
| 2,310,979 | Mercer | Feb. 16, 1943 |
| 2,336,052 | Anderson et al. | Dec. 7, 1943 |
| 2,352,579 | Hageman | Feb. 22, 1944 |
| 2,545,815 | Klinge | Mar. 20, 1951 |